United States Patent
Jo et al.

(10) Patent No.: US 11,041,032 B2
(45) Date of Patent: Jun. 22, 2021

(54) METHOD FOR PREPARING CONJUGATED DIENE-BASED COPOLYMER, CONJUGATED DIENE-BASED COPOLYMER PREPARED THEREFROM, RUBBER COMPOSITION COMPRISING THE SAME

(71) Applicant: LG Chem, Ltd., Seoul (KR)

(72) Inventors: In Sung Jo, Daejeon (KR); Byoung Yun Kim, Daejeon (KR); Hyung Woon Yoon, Daejeon (KR); Jae Min Lee, Daejeon (KR); Woo Seok Choi, Daejeon (KR)

(73) Assignee: LG Chem, Ltd.

( * ) Notice: Subject to any disclaimer, the term of this patent is extended or adjusted under 35 U.S.C. 154(b) by 155 days.

(21) Appl. No.: 16/464,498

(22) PCT Filed: Aug. 13, 2018

(86) PCT No.: PCT/KR2018/009273
§ 371 (c)(1),
(2) Date: May 28, 2019

(87) PCT Pub. No.: WO2019/045319
PCT Pub. Date: Mar. 7, 2019

(65) Prior Publication Data
US 2020/0223960 A1 Jul. 16, 2020

(30) Foreign Application Priority Data
Aug. 30, 2017 (KR) .......................... 10-2017-0109814

(51) Int. Cl.
| | | |
|---|---|---|
| C08F 12/12 | (2006.01) | |
| C08F 2/22 | (2006.01) | |
| C08F 20/06 | (2006.01) | |
| C08F 36/04 | (2006.01) | |
| C08F 36/06 | (2006.01) | |
| C08F 36/08 | (2006.01) | |
| C08K 3/36 | (2006.01) | |

(52) U.S. Cl.
CPC ............... *C08F 36/06* (2013.01); *C08F 2/22* (2013.01); *C08F 12/12* (2013.01); *C08F 20/06* (2013.01); *C08F 36/045* (2013.01); *C08F 36/08* (2013.01); *C08K 3/36* (2013.01)

(58) Field of Classification Search
CPC .. C08F 220/26; C08F 220/28; C08F 220/281; C08F 220/301; C08F 212/04; C08F 212/06; C08F 212/12; C08F 36/04; C08F 36/045; C08F 36/06; C08F 36/08; C08F 12/12
See application file for complete search history.

(56) References Cited

U.S. PATENT DOCUMENTS

| | | | |
|---|---|---|---|
| 3,393,169 A * | 7/1968 | Glenn | .................. C09D 125/10 523/305 |
| 6,057,397 A | 5/2000 | Takagishi et al. | |
| 6,342,559 B1 | 1/2002 | Takagishi | |
| 6,391,997 B1 | 5/2002 | Sugihara et al. | |
| 2002/0052435 A1 | 5/2002 | Konno et al. | |
| 2002/0061955 A1 | 5/2002 | Colvin et al. | |
| 2002/0173560 A1 | 11/2002 | Thielen | |
| 2003/0125468 A1 | 7/2003 | Thielen et al. | |
| 2008/0293902 A1 | 11/2008 | Obrecht et al. | |
| 2010/0120973 A1 | 5/2010 | Obrecht | |
| 2010/0247786 A1 | 9/2010 | Schroeder et al. | |
| 2011/0098404 A1 | 4/2011 | Kwag et al. | |
| 2012/0164363 A1 | 6/2012 | Kwag et al. | |
| 2015/0011697 A1 | 1/2015 | Brown et al. | |
| 2016/0068659 A1 | 3/2016 | Moutinho et al. | |
| 2016/0200903 A1 | 7/2016 | Okamatsu et al. | |

FOREIGN PATENT DOCUMENTS

| | | |
|---|---|---|
| CN | 101868483 A | 10/2010 |
| EP | 0870786 A1 | 10/1998 |
| JP | 2792165 B2 | 8/1998 |
| JP | H11246606 A | 9/1999 |
| JP | 200220543 A | 1/2002 |
| JP | 2002047305 A | 2/2002 |
| JP | 2002145964 A | 5/2002 |
| JP | 2002293994 A | 10/2002 |
| JP | 2016529347 A | 9/2016 |
| KR | 20100008798 A | 1/2010 |
| KR | 20100054102 A | 5/2010 |
| KR | 20100100887 A | 9/2010 |
| KR | 20110044052 A | 4/2011 |
| KR | 20120073999 A | 7/2012 |
| KR | 20160012135 A | 2/2016 |
| KR | 101696238 B1 | 1/2017 |
| RU | 2235740 C2 | 9/2004 |
| RU | 2412210 C2 | 2/2011 |
| WO | 9623027 A1 | 8/1996 |

OTHER PUBLICATIONS

International Search Report for Application No. PCT/KR2018/009273 dated Nov. 23, 2018.
Extended European Search Report with Written Opinion for Application No. EP18851985.4 dated Sep. 23, 2019, 6 pages.
Search Report from Chinese Office Action for Application No. 2018800046158 dated Feb. 26, 2021; 2 pages.
C4 C5 Olefin Engineering, "Diolefin Production Process," Xie Lifan, Editor, Petrochemical Engineering Series, Chemical Industry Press, Beijing, Apr. 1998, ISBN: 7-5025-1998-X, 712 pages.

\* cited by examiner

*Primary Examiner* — Irina S Zemel
*Assistant Examiner* — Jeffrey S Lenihan
(74) *Attorney, Agent, or Firm* — Lerner, David, Littenberg, Krumholz & Mentlik, LLP (57) ABSTRACT

Provided is a method for preparing a conjugated diene-based copolymer, a conjugated diene-based copolymer prepared therefrom, and a rubber composition including the same.

12 Claims, 1 Drawing Sheet

METHOD FOR PREPARING CONJUGATED DIENE-BASED COPOLYMER, CONJUGATED DIENE-BASED COPOLYMER PREPARED THEREFROM, RUBBER COMPOSITION COMPRISING THE SAME

CROSS-REFERENCE TO RELATED APPLICATIONS

The present application is a national phase entry under 35 U.S.C. § 371 of International Application No. PCT/KR2018/009273 filed Aug. 13, 2018, which claims priority from Korean Patent Application No. 10-2017-0109814 filed Aug. 30, 2017, all of which are incorporated herein by reference.

TECHNICAL FIELD

The present invention relates to a method for preparing a conjugated diene-based copolymer, a conjugated diene-based copolymer prepared therefrom, and a rubber composition comprising the same.

BACKGROUND ART

In recent years, as an interest in eco-friendly technologies has increased, there is a growing interest in eco-friendly tires to be applied to automobiles. The eco-friendly tires, which are directly connected to low fuel consumption through fuel saving of automobiles, decrease rolling resistance of tires, thereby reducing unnecessary combustion consumption, and reduce the emission of carbon dioxide, which is a main cause of global warming.

Therefore, there is a demand for a conjugated diene-based polymer having a low rolling resistance, excellent abrasion resistance, excellent tensile properties, and also having adjustment stability represented by wet road surface resistance, as a rubber material used in the eco-friendly tires.

In order to reduce the rolling resistance of the tire, there is a method for reducing hysteresis loss of a vulcanized rubber. As evaluation indexes of the vulcanized rubber, rebound resilience of 50° C. to 80° C., tan $\delta$, and Goodrich heating, and the like, are used. In other words, it is preferable to use a rubber material having large rebound resilience or a small tan $\delta$ and Goodrich heating at the above-described temperature.

Natural rubbers, polyisoprene rubbers, polybutadiene rubbers, or the like are known as rubber materials having a small hysteresis loss. However, these rubber materials have a problem of low wet road surface resistance. Accordingly, recently, a conjugated diene polymer or copolymer such as a styrene-butadiene rubber (hereinafter referred to as SBR) or a butadiene rubber (hereinafter referred to as BR) has been produced by emulsion polymerization or solution polymerization and used as a rubber for a tire.

These rubbers for a tire are generally used is in combination with filler such as carbon black, silica, or the like, for complementing physical properties of the rubber. Among them, the SBR produced by solution polymerization has been used by introducing a monomer having a polar group at the end of the polymer through anionic polymerization to improve silica affinity of the silica filler, but this SBR produced by the solution polymerization has a problem in that abrasion resistance is lower than that of the SBR produced by emulsion polymerization. Further, the SBR produced by the emulsion polymerization has difficulty in introducing a repeating unit derived from a desired monomer into a specific portion due to properties of the emulsion polymerization, thus making it difficult to introduce a polar group for improving the silica affinity of the silica filler into a polymer chain.

Therefore, there is a continuing need to study rubber materials for tires having excellent affinity with the filler, while using the SBR produced by emulsion polymerization so as to improve the abrasion resistance of tires.

DISCLOSURE

Technical Problem

An object of the present invention is to provide a conjugated diene-based copolymer polymerized by emulsion polymerization to secure abrasion resistance of a rubber composition while increasing a glass transition temperature of the conjugated diene-based copolymer and imparting silica affinity, thereby improving abrasion resistance and viscoelastic properties of the rubber composition.

In other words, the present invention has an object of providing a method for preparing a conjugated diene-based copolymer capable of improving abrasion resistance and viscoelastic properties of the rubber composition including the conjugated diene-based copolymer prepared by emulsion polymerization.

Technical Solution

In one general aspect, a method for preparing a conjugated diene-based copolymer includes: (S10) performing emulsion polymerization on an $\alpha$-methylstyrene monomer, a conjugated diene-based monomer, and a hydroxyalkyl (meth)acrylate monomer, wherein the $\alpha$-methylstyrene monomer and the conjugated diene-based monomer are added together at one time when a polymerization conversion ratio of the emulsion polymerization is 0%, and the hydroxyalkyl(meth)acrylate monomer is divisionally added two or more times when the polymerization conversion ratio of the emulsion polymerization is 0% to 80%, the $\alpha$-methylstyrene monomer is added in an amount of 10% by weight to 50% by weight, the conjugated diene-based monomer is added in an amount of 49% by weight to 89% by weight, and the hydroxyalkyl(meth)acrylate monomer is added in an amount of 0.1% by weight to 5% by weight, based on the total monomer amount.

In another general aspect, a conjugated diene-based copolymer includes: 10% by weight to 50% by weight of an $\alpha$-methylstyrene monomer-derived repeating unit, 49% by weight to 89% by weight of a conjugated diene-based monomer-derived repeating unit, and 0.1% by weight to 5% by weight of a hydroxypropylmethacrylate monomer-derived repeating unit, based on the total amount of monomer-derived repeating units included in the conjugated diene-based copolymer, wherein an amount of the hydroxyalkyl (meth)acrylate monomer-derived repeating unit is maintained within a range of deviation ±2% by weight based on the total amount of the respective conjugated diene-based copolymers according to the polymerization conversion ratio.

In still another general aspect, a rubber composition includes: a raw rubber including the conjugated diene-based copolymer as described above; and at least one rubber component selected from the group consisting of natural rubber and synthetic rubber.

Advantageous Effects

According to the present invention, the conjugated diene-based copolymer is polymerized by emulsion polymerization to secure abrasion resistance of a rubber composition including a conjugated diene-based copolymer while simultaneously increasing a glass transition temperature of the conjugated diene-based copolymer and imparting silica affinity, thereby achieving excellent abrasion resistance and viscoelastic properties of the rubber composition including the conjugated diene-based copolymer.

BEST MODE

Figure 1:
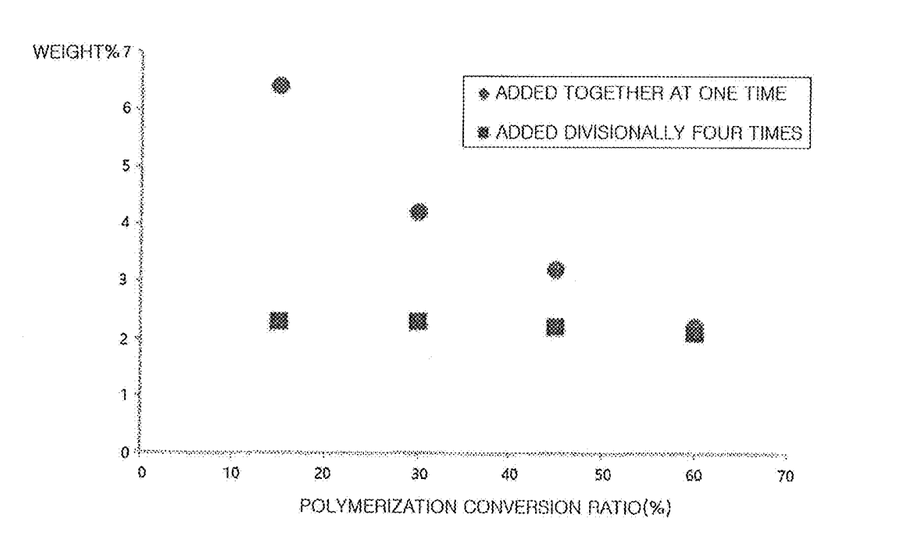
The FIGURE is a graph showing an amount of a hydroxyalkyl(meth)acrylate monomer-derived repeating unit in a copolymer for each polymerization conversion ratio in preparing conjugated diene-based copolymers according to Examples and Comparative Examples of the present invention.

Terms and words used in the present specification and claims are not to be construed as a general or dictionary meaning but are to be construed as meaning and concepts meeting the technical ideas of the present invention based on a principle that the inventors can appropriately define the concepts of terms in order to describe their own inventions in best mode.

Hereinafter, the present disclosure will be described in more detail to assist in understanding the technical idea of the present invention.

A method for preparing a conjugated diene-based copolymer according to the present invention may include: (S10) performing emulsion polymerization on an α-methylstyrene monomer, a conjugated diene-based monomer, and a hydroxyalkyl(meth)acrylate monomer, wherein the α-methylstyrene monomer and the conjugated diene-based monomer may be added together at one time when a polymerization conversion ratio of the emulsion polymerization is 0%, and the hydroxyalkyl(meth)acrylate monomer is divisionally added two or more times when the polymerization conversion ratio of the emulsion polymerization is 0% to 80%, the α-methylstyrene monomer is added in an amount of 10% by weight to 50% by weight, the conjugated diene-based monomer is added in an amount of 49% by weight to 89% by weight, and the hydroxyalkyl(meth)acrylate monomer is added in an amount of 0.1% by weight to 5% by weight, based on the total monomer amount.

According to an embodiment of the present invention, the method for preparing a conjugated diene-based copolymer employs an α-methylstyrene monomer as an aromatic vinyl monomer, wherein an α-methylstyrene monomer-derived repeating unit formed by polymerizing an α-methylstyrene monomer has a higher glass transition temperature than that of a styrene monomer-derived repeating unit formed by polymerizing a generally used styrene monomer. Thus, it is possible to form a copolymer having a higher glass transition temperature even if the same amount is added and included. As a result, due to the high glass transition temperature, a rubber composition including the conjugated diene-based copolymer prepared by the method for preparing a conjugated diene-based copolymer may have improved wet road surface resistance. Further, when the α-methylstyrene monomer is used as the aromatic vinyl monomer according to the present invention, as compared to the styrene monomer in which a block-forming ratio is high due to high reactivity, at the time of polymerization of a random copolymer, a random ratio is high, and thus the α-methylstyrene monomer-derived repeating units are uniformly distributed in the copolymer, thereby having excellent balance among physical properties of the rubber composition including the conjugated diene-based copolymer prepared by the method for preparing the conjugated diene-based copolymer.

According to an embodiment of the present invention, the α-methylstyrene monomer may be added in an amount of 10% by weight to 50% by weight, 15% by weight to 45% by weight, or 23% by weight to 40% by weight based on the total monomer amount. Within this range, it is possible to have excellent viscoelastic characteristics while preventing tensile properties from being deteriorated.

Further, according to an embodiment of the present invention, the conjugated diene-based monomer, which is a monomer for forming a back bone in the copolymer together with the α-methylstyrene monomer and the hydroxyalkyl(meth)acrylate monomer, may be at least one selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (wherein halo means a halogen atom).

According to an embodiment of the present invention, the conjugated diene-based monomer may be added in an amount of 49% by weight to 89% by weight, 44% by weight to 84% by weight, or 36% by weight to 79% by weight based on the total monomer amount. Within this range, it is possible to have excellent viscoelastic characteristics and excellent balance of physical properties.

In addition, the hydroxyalkyl(meth)acrylate monomer according to an embodiment of the present invention is a monomer for forming a back bone in the copolymer together with the α-methylstyrene monomer and the conjugated diene-based monomer to be distributed in the copolymer to impart affinity with a silica-based filler, wherein a (meth) acrylate group of the hydroxyalkyl(meth)acrylate monomer participates in a radical polymerization reaction, and a hydroxy group of the hydroxyalkyl(meth)acrylate monomer-derived repeating unit distributed in the copolymer after polymerization is hydrogen bonded with a hydroxyl group present in the silica-based filler, or the like, thereby providing affinity between the conjugated diene-based copolymer and the silica-based filler, and as a result, dispersibility of the filler in the rubber composition may be excellent, thus resulting in improvement of mechanical properties of the rubber composition.

According to an embodiment of the present invention, the hydroxyalkyl(meth)acrylate monomer may be a hydroxyalkyl(meth)acrylate monomer in which an alkyl group is an alkyl group having 1 to 10 carbon atoms, 2 to 8 carbon atoms, or 2 to 4 carbon atoms. Within this range, it is possible to prevent an increase in hydrophobicity of the hydroxyalkyl(meth)acrylate monomer by the alkyl group, thereby improving the affinity with the silica-based filler. As a specific example, the hydroxyalkyl(meth)acrylate monomer may be at least one selected from the group consisting of hydroxyethyl(meth)acrylate, hydroxypropyl(meth)acrylate, and hydroxybutyl(meth)acrylate. Here, the hydroxyalkyl(meth)acrylate monomer may mean hydroxyalkyl acrylate or hydroxyalkyl methacrylate.

According to an embodiment of the present invention, the hydroxyalkyl(meth)acrylate monomer may be added in an amount of 0.1% by weight to 5% by weight, 1% by weight to 3% by weight, or 1.5% by weight to 2.5% by weight, based on the total monomer amount. Within this range, it is possible to prevent deterioration of mechanical properties of the rubber composition caused by reduction in amounts of other monomers-derived repeating units in the conjugated diene-based copolymer, to maximize the affinity with the silica-based filler, thereby entirely improving mechanical properties of the rubber composition and having excellent balance among physical properties.

The method for preparing a conjugated diene-based copolymer of the present invention may be performed by emulsion polymerization as described above. The emulsion polymerization may be performed by an emulsion polymerization method for performing radical polymerization of each monomer, and specifically may be performed in the presence of an emulsifier, an initiator, a molecular weight regulator, and the like.

However, according to an embodiment of the present invention, regarding the time when each monomer is added, the α-methylstyrene monomer and the conjugated diene-based monomer may be added together at one time when the polymerization conversion ratio before beginning the reaction, i.e., before the initiation of the polymerization is 0%. However, the hydroxyalkyl(meth)acrylate monomer has a very high reaction rate at the time of polymerization, thus causing a problem in that the monomer is already polymerized and consumed at the early stage of the reaction, i.e., at a low polymerization conversion ratio. As a result, the hydroxyalkyl(meth)acrylate monomer-derived repeating units for imparting affinity with the silica-based filler in the polymer may not be uniformly distributed, but may be concentrated in a specific portion, and thus an effect of imparting silica affinity which is desired in the present invention may be insignificant.

Thus, according to an embodiment of the present invention, the hydroxyalkyl(meth)acrylate monomer may be divisionally added two or more times at the time when the polymerization conversion ratio of the emulsion polymerization is 0% to 80%. The above-described divisional addition two or more times may mean that the hydroxyalkyl (meth)acrylate monomer is divisionally added so that the hydroxyalkyl(meth)acrylate monomer may be uniformly distributed in the copolymer at the time when the polymerization conversion ratio is 0% to 80%. The time when the polymerization conversion ratio is 0% to 80% may mean the time point at which the polymerization conversion ratio is divided within the range of the polymerization conversion ratio according to the number of divisional addition times, and for example, may be the polymerization conversion ratio of 0% and 30%; the polymerization conversion ratio of 0% and 40%; the polymerization conversion ratio of 0% and 60%; the polymerization conversion ratio of 0% and 80%; the polymerization conversion ratio of 0%, 20% and 40%; the polymerization conversion ratio of 0%, 30% and 60%; the polymerization conversion ratio of 0%, 40% and 80%; the polymerization conversion ratio of 0%, 15%, 30% and 45%; the polymerization conversion ratio of 0%, 20%, 40% and 60%; the polymerization conversion ratio of 0%, 27%, 54% and 80%; the polymerization conversion ratio of 0%, 12%, 24%, 36%, 48%; and the polymerization conversion ratio of 0%, 10%, 20%, 30%, 40%, 50%, and the like. However, the divisional addition time is not limited to the above examples, but may have an error of ±10% or ±5% depending on the polymerization process and the environment at each time point. As described above, when the hydroxyalkyl(meth)acrylate monomer is divisionally added two or more times according to the present invention, the hydroxyalkyl(meth)acrylate monomer-derived repeating units may be uniformly distributed in the conjugated diene-based copolymer, thereby maximizing silica affinity. More specifically, the hydroxyalkyl(meth)acrylate monomer may be divisionally added two to four times at the time when the polymerization conversion ratio of the emulsion polymerization is 0% to 60%. Within this range, it is possible to prevent polymerization productivity at the time of polymerization from being deteriorated while improving the silica affinity desired in the present invention.

In addition, according to an embodiment of the present invention, when the hydroxyalkyl(meth)acrylate monomer is divisionally added two or more times at the time of the emulsion polymerization, as an added amount for each addition period, the amount may be arbitrarily divided within the total amount of the hydroxyalkyl(meth)acrylate monomer to be added, or the same amount obtained by dividing the total added amount into the number of divisional addition times may be divisionally added at each divisional addition. In order to achieve uniform distribution in the copolymer, it is preferable to divide the total added amount into the number of divisional addition times and to divisionally add the same amount at each divisional addition.

According to an embodiment of the present invention, when the hydroxyalkyl(meth)acrylate monomer is divisionally added two or more times at the time of the emulsion polymerization, the hydroxyalkyl(meth)acrylate monomer may be uniformly distributed in the conjugated diene-based copolymer even though the hydroxyalkyl(meth)acrylate monomer is included in a small amount, and thus it is possible to reduce the added amount of the hydroxyalkyl (meth)acrylate monomer as compared to a case where the hydroxyalkyl(meth)acrylate monomer is added together at one time at the early stage of the reaction, i.e., at the time when the polymerization conversion ratio is 0%. Thus, it is possible to minimize the reduction in the added amount of the α-methylstyrene monomer and the conjugated diene-based monomer due to the addition of the hydroxyalkyl (meth)acrylate monomer, thereby preventing mechanical properties of the conjugated diene-based copolymer from being deteriorated. As a specific example, the amount of the hydroxyalkyl(meth)acrylate monomer-derived repeating unit may be maintained within a range of deviation ±2% by weight, ±1% by weight or ±0.5% by weight based on the total amount of the respective conjugated diene-based copolymers according to the polymerization conversion ratio of the emulsion polymerization. As a more specific example, the amount of the hydroxyalkyl(meth)acrylate monomer-derived repeating unit may be maintained within a range of 0.1% by weight to 5% by weight, 1% by weight to 3% by weight or 1.5% by weight to 2.5% by weight based on the total amount of the respective conjugated diene-based copolymers according to the polymerization conversion ratio of the emulsion polymerization. Within this range, the silica affinity may be improved, thereby achieving excellent viscoelastic characteristics of the rubber composition including the prepared conjugated diene-based copolymer.

According to an embodiment of the present invention, the emulsifier to be added at the time of the emulsion polymerization may be an emulsifier which is commonly used in the art. As a specific example, at least one emulsifier selected from the group consisting of phosphate-based, carboxylate-based, sulfate-based, succinate-based, sulfosuccinate-based, sulfonate-based, disulfonate-based emulsifiers, and the like, may be used. More specifically, it is possible to use at least one emulsifier selected from the group consisting of alkyl aryl sulfonate, alkaline methyl alkyl sulfate, sulfonated alkyl ester, a soap of fatty acid and an alkali salt of rosin acid. In this case, there is an effect of providing a stable polymerization environment. The emulsifier may be added, for example, in an amount of 0.1 partS by weight to 5 parts by weight, or 0.5 partS by weight to 3 parts by weight based on 100 parts by weight of the total monomer amount. Within this range, polymerization stability of the latex is excellent, and occurrence of bubbles at the time of the polymerization may be minimized.

According to an embodiment of the present invention, at the time of the emulsion polymerization, a molecular weight regulator to be added may be at least one selected from the group consisting of mercaptans such as α-methylstyrene dimer, t-dodecyl mercaptan, n-dodecyl mercaptan, octyl mercaptan, and the like; halogenated hydrocarbons such as carbon tetrachloride, methylene chloride, methylene bromide, and the like; sulfur-containing compounds such as tetraethylthiuram disulfide, dipentamethylenethiuram disulfide, and diisopropyl xanthogen disulfide, and may be t-dodecylmercaptan as a specific example. The molecular weight regulator may be added, for example, in an amount of 0.2 parts by weight to 0.6 parts by weight based on 100 parts by weight of the total monomer amount.

According to an embodiment of the present invention, at the time of the emulsion polymerization, the polymerization initiator to be added, which is for controlling a molecular weight, a gel amount, and a gel structure of the conjugated diene-based copolymer according to the present invention, may be a radical initiator. Examples of the radical initiator may include inorganic peroxides such as sodium persulfate, potassium persulfate, ammonium persulfate, potassium perphosphate, hydrogen peroxide, and the like; organic peroxides such as t-butyl peroxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, 3,5,5-trimethylhexanol peroxide, t-butyl peroxyisobutylate, and the like; azobis-based compounds such as azobisisobutyronitrile, azobis-2,4-dimethylvaleronitrile, azobiscyclohexanecarbonitrile, azobisisobutyric acid (butyl acid) methyl, and the like. As a specific example, the radical initiator may be the inorganic peroxide, and more specifically, persulfate. The polymerization initiator may be added in an amount of 0.01 to 2 parts by weight or 0.02 to 1.5 parts by weight based on 100 parts by weight of the total monomer amount. Within this range, a polymerization rate may be appropriately controlled, and thus the polymerization may be controlled and productivity may be excellent.

Further, according to an embodiment of the present invention, at the time of the emulsion polymerization, additives such as an activator, a chelating agent, a dispersant, a pH adjuster, a deoxidizer, a particle size regulator, an anti-aging agent, an oxygen scavenger, and the like, may be added as required within a range in which physical properties of the rubber composition are not deteriorated.

In addition, according to an embodiment of the present invention, the emulsion polymerization may be performed at a low temperature, and specifically at a low temperature, from 5° C. to 10° C., and the polymerization may be terminated after polymerization at a polymerization conversion ratio of 60% to 80%, or 60% to 70%, or 60%. In this case, the gel content is low and the processability is excellent.

According to an embodiment of the present invention, the method for producing a conjugated diene-based copolymer may include coagulating, aging, dehydrating and drying steps in order to prepare the copolymer composition latex which is obtained by emulsion polymerization in the form of a powder.

Further, according to the present invention, there is provided a conjugated diene-based copolymer prepared by the above-described method for preparing a conjugated diene-based copolymer.

According to an embodiment of the present invention, the conjugated diene-based copolymer may include 10% by weight to 50% by weight of an α-methylstyrene monomer-derived repeating unit, 49% by weight to 89% by weight of a conjugated diene-based monomer-derived repeating unit, and 0.1% by weight to 5% by weight of a hydroxypropylmethacrylate monomer-derived repeating unit, based on the total amount of monomer-derived repeating units included in the conjugated diene-based copolymer, wherein an amount of the hydroxyalkyl(meth)acrylate monomer-derived repeating unit is maintained within a range of deviation ±2% by weight based on the total amount of the respective conjugated diene-based copolymers according to the polymerization conversion ratio.

The term "monomer-derived repeating unit" used herein may refer to a component, structure, or a material itself resulting from each monomer, and may refer to a repeating unit constituted in the polymer obtained when monomers to be added participate in a polymerization reaction to form the polymer.

According to an embodiment of the present invention, the conjugated diene-based copolymer may be a random copolymer in which each monomer-derived repeating unit is randomly distributed in the copolymer, and, according to the object in the method for preparing the conjugated diene-based copolymer, the respective monomer-derived repeating units may be more uniformly distributed, and the respective monomer-derived repeating units may perform functions described in the method for preparing the conjugated diene-based copolymer in the copolymer.

According to an embodiment of the present invention, the amount of the hydroxyalkyl(meth)acrylate monomer-derived repeating unit may be maintained within a range of deviation ±2% by weight, ±1% by weight or ±0.5% by weight based on the total amount of the respective conjugated diene-based copolymers according to the polymerization conversion ratio. As more specific examples, the amount of the hydroxyalkyl(meth)acrylate monomer-derived repeating unit may be maintained within a range of 0.1% by weight to 5% by weight, 1% by weight to 3% by weight or 1.5% by weight to 2.5% by weight based on the total amount of the respective conjugated diene-based copolymers according to the polymerization conversion ratio. Within this range, the silica affinity may be improved, thereby achieving excellent viscoelastic characteristics of the rubber composition including the prepared conjugated diene-based copolymer. The amount of the hydroxyalkyl(meth)acrylate monomer-derived repeating unit based on the total amount of the respective conjugated diene-based copolymers according to the polymerization conversion ratio may indicate that the hydroxyalkyl(meth)acrylate monomer-derived repeating units are uniformly distributed in the repeating units constituting the conjugated diene-based copolymer according to the present invention.

According to an embodiment of the present invention, the conjugated diene-based copolymer may have a weight average molecular weight of 100,000 g/mol to 2,000,000 g/mol, 300,000 g/mol to 2,000,000 g/mol, or 500,000 g/mol to 2,000,000 g/mol. Within this range, the rubber composition including the conjugated diene-based copolymer may have excellent mechanical properties. As another example, the conjugated diene-based copolymer may have a molecular weight distribution (Mw/Mn) of 1.5 to 5.0, 1.8 to 3.5, or 1.8 to 3.0. Within this range, it is possible to achieve excellent balance among respective physical properties.

Further, according to an embodiment of the present invention, the conjugated diene-based copolymer may have a Mooney viscosity (MV) at 100° C. of 20 to 150, 30 to 120, or to 85. Within this range, it is possible to have excellent processability and productivity of the rubber composition, and to achieve excellent mechanical properties.

According to an embodiment of the present invention, the conjugated diene-based copolymer may have a glass transition temperature of −53° C. or higher, −35° C. or higher, or −32° C. or higher. Within this range, the rubber composition including the conjugated diene-based copolymer may have excellent abrasion resistance and viscoelastic characteristics.

Further, according to the present invention, there is provided a rubber composition that includes a raw rubber including the conjugated diene-based copolymer.

According to an embodiment of the present invention, the raw rubber may include 10% by weight or more, or 10% by weight to 100% by weight, or 50% by weight to 90% by weight of the conjugated diene-based copolymer. Within this range, it is possible to achieve excellent mechanical properties such as tensile strength, abrasion resistance, and the like, and excellent balance among physical properties.

Further, according to an embodiment of the present invention, in addition to the conjugated diene-based copolymer, the raw material rubber may further include at least one rubber component selected from the group consisting of natural rubber and synthetic rubber if necessary. Here, the rubber component may be included in an amount of 90% by weight or less, or 10% by weight to 40% by weight based on the total amount of the raw rubber. As a specific example, the rubber component may be included in an amount of 1 part by weight to 900 parts by weight based on 100 parts by weight of the conjugated diene-based copolymer. The rubber component may be, for example, natural rubber or synthetic rubber. Specific examples of the rubber component may include natural rubber (NR) such as cis-1,4-polyisoprene; modified natural rubber, which is obtained by modification or refinement of general natural rubber, such as epoxidized natural rubber (ENR), deproteinized natural rubber (DPNR), hydrogenated natural rubber, and the like; synthetic rubber such as styrene-butadiene copolymer (SBR), polybutadiene (BR), polyisoprene (IR), butyl rubber (IIR), ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, butyl rubber, halogenated butyl rubber, and the like, and any one or a mixture of two or more thereof may be used.

According to an embodiment of the present invention, the rubber composition may include 1 part by weight to 200 parts by weight, or 10 parts by weight to 120 parts by weight of a silica-based filler based on 100 parts by weight of the raw rubber. As a specific example, the silica-based filler may be at least one selected from the group consisting of wet silica, dry silica, calcium silicate, aluminum silicate, and colloidal silica, and preferably may be a wet silica in which both an effect of improving fracture characteristics and an effect of achieving wet grip are the most excellent. In addition, the rubber composition may further include a carbon black-based filler as required.

As another example, when silica is used as the filler, a silane coupling agent may be used together for improving reinforcing property and low exothermic property. Specific examples of the silane coupling agent may include bis(3-triethoxysilylpropyl)tetrasulfide, bis(3-triethoxysilylpropyl) trisulfide, bis(3-triethoxysilylpropyl)disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N, N-dimethylthiocarbamoyltetrasulfide, 2-triethoxysilylethyl-N, N-dimethylthiocarbamoyltetrasulfide, 3-trimethoxysilylpropylbenzothiazolyl tetrasulfide, 3-triethoxysilylpropylbenzol tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide or dimethoxymethylsilylpropylbenzothiazolyl tetrasulfide, and the like, and any one or a mixture of two or more thereof may be used. Preferably, silane coupling agent may be bis(3-triethoxysilylpropyl)polysulfide or 3-trimethoxysilylpropylbenzothiazyl tetrasulfide in consideration of the effect of improving the reinforcing property.

In addition, since the rubber composition according to an embodiment of the present invention includes the conjugated diene-based copolymer into which a functional group imparted with affinity for silica is introduced into the repeating unit forming the copolymer, a blending amount of the silane coupling agent may be lowered than a general case. Thus, the silane coupling agent may be used in an amount of 1 part by weight to 20 parts by weight, or 5 parts by weight to 15 parts by weight, based on 100 parts by weight of the silica-based filler. Within this range, an effect as a coupling agent may be sufficiently exhibited, and gelation of the raw rubber may be prevented.

The rubber composition according to an embodiment of the present invention may be sulfur-crosslinkable and may further include a vulcanizing agent. The vulcanizing agent may be specifically a sulfur powder and may be included in an amount of 0.1 parts by weight to 10 parts by weight based on 100 parts by weight of the raw rubber. Within this range, it is possible to secure elastic modulus and strength required for the vulcanized rubber composition and simultaneously achieve excellent low fuel consumption.

The rubber composition according to an embodiment of the present invention may further include various additives commonly used in the rubber industry, such as vulcanization accelerator, process oil, plasticizer, antioxidant, scorch inhibitor, zinc white, stearic acid, thermosetting resin, thermoplastic resin, or the like, in addition to the above-described components.

Examples of the vulcanization accelerator may include thiazole-based compounds such as 2-mercaptobenzothiazole (M), dibenzothiazyl disulfide (DM), N-cyclohexyl-2-benzothiazyl sulfonamide (CZ), guanidine-based compounds such as diphenylguanidine (DPG), and the like. The vulcanization accelerator may be included in an amount of 0.1 parts by weight to 5 parts by weight based on 100 parts by weight of the raw rubber.

The process oil, which acts as a softening agent in the rubber composition, may be a paraffinic, naphthenic, or aromatic compound, and may be aromatic process oil in consideration of tensile strength and abrasion resistance and naphthenic process oil or paraffinic process oil in consideration of hysteresis loss and low temperature characteristics. The process oil may be included in, for example, an amount of 100 parts by weight or less based on 100 parts by weight of the raw rubber. Within this range, it is possible to prevent the tensile strength and the low exothermicity (low fuel consumption) of the vulcanization rubber from being deteriorated.

Examples of the anti-aging agent may include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a high-temperature condensate of diphenylamine and acetone, and the like. The anti-aging agent may be included in an amount of 0.1 parts by weight to 6 parts by weight based on 100 parts by weight of the raw rubber.

The rubber composition according to an embodiment of the present invention may be obtained by kneading using a kneader such as Banbury mixer, roll, internal mixer, or the like, by the blending composition, and a vulcanizing step after the molding processing may be performed to obtain a rubber composition having low exothermic property and excellent abrasion resistance.

According to an embodiment of the present invention, the rubber composition may be used for production of respective tire members such as a tire tread, an under-tread, a sidewall, a carcass coated rubber, a belt coated rubber, a bead filler, a chafer, a bead coated rubber, and the like, or production of various kinds of industrial rubber such as an anti-vibration rubber, a belt conveyor, a hose, and the like.

In addition, the present invention provides a tire produced using the rubber composition.

The tire may be a tire or a tire tread, and specific examples of the tire or the tire tread may be a tire used for a summer tire, a winter tire, a snow tire, or an all-season tire (for all seasons) or a tire tread.

Hereinafter, the following Examples of the present disclosure are described in more detail. It is obvious to those skilled in the art, however, that the following Examples are illustrative of the present invention and that various changes and modifications can be made within the scope and spirit of the invention, and thus the scope of the present invention is not limited thereto.

EXAMPLE

Example 1

200 parts by weight of ion-exchanged water, 48 parts by weight of α-methylstyrene, 50 parts by weight of 1,3-butadiene, and 0.5 parts by weight of hydroxypropyl methacrylate, 5 parts by weight of a soap of fatty acid and an alkali salt of rosin acid as an emulsifier, 0.5 parts by weight of cumene hydroperoxide as an initiator, and 0.5 parts by weight of dodecylmercaptan as a molecular weight regulator were added together at one time to a nitrogen-substituted polymerization reactor (autoclave), and the reaction was performed at a reaction temperature of 10° C. In the above reaction, 0.5 parts by weight of hydroxypropyl methacrylate, which is a monomer, was added together at one time to the mixture at each time when polymerization conversion ratios reached 15%, 30% and 45%, and the reaction was terminated at the polymerization conversion ratio of 60% to prepare a conjugated diene-based copolymer latex.

Thereafter, the resultant conjugated diene-based copolymer latex was slowly dropped into methanol and precipitated, and then dried in an oven at 100° C. for 1 hour to obtain a conjugated diene-based copolymer powder.

Example 2

Example 2 was performed in the same manner as in Example 1, except that 1 part by weight of hydroxypropyl methacrylate was added together at one time to the mixture before the initiation of the polymerization (polymerization conversion ratio: 0%) and when the polymerization conversion ratio reached 30%, respectively.

Example 3

Example 3 was performed in the same manner as in Example 1 except that hydroxybutyl methacrylate instead of hydroxypropyl methacrylate was added in the same amount and at the same frequency when the conjugated diene-based copolymer latex was produced.

Comparative Example 1

Comparative Example 1 was performed in the same manner as in Example 1 except that styrene instead of α-methyl styrene was added in the same amount when the conjugated diene-based copolymer latex was produced.

Comparative Example 2

Comparative Example 2 was performed in the same manner as in Example 1 except that 49 parts by weight of α-methyl styrene and 51 parts by weight of 1,3-butadiene were added without adding the hydroxypropyl methacrylate when the conjugated diene-based copolymer latex was produced.

Comparative Example 3

Comparative Example 3 was performed in the same manner as in Example 1 except that 2 parts by weight of hydroxypropyl methacrylate was added together at one time to the mixture before the initiation of the polymerization (polymerization conversion ratio: 0%) when the conjugated diene-based copolymer latex was produced.

EXPERIMENTAL EXAMPLE

Experimental Example 1

The weight average molecular weight, the number average molecular weight, the molecular weight distribution, the Mooney viscosity (MV), and the glass transition temperature (Tg) of the conjugated diene-based copolymers prepared in Examples 1 to 3 and Comparative Examples 1 to 3 were shown in Table 1 below, together with the composition.

Weight average molecular weight (Mw, g/mol), number average molecular weight (Mn, g/mol), molecular weight distribution (MWD): The weight average molecular weight and the number average molecular weight were measured by gel permeation chromatography (GPC), and the molecular weight distribution (MWD, Mw/Mn) was calculated from the respectively measured molecular weights. Specifically, the GPC was used in combination with two PLgel Olexis (manufactured by Polymer Laboratories) columns and one PLgel mixed-C (manufactured by Polymer Laboratories) column. When the molecular weight was calculated, polystyrene (PS) was used as the GPC standard material.

Mooney viscosity (MV (ML1+4, @100° C.) MU): The Mooney viscosity was measured by using MV-2000 (manufactured by ALPHA Technologies) at 100° C. at a rotor speed of 2±0.02 rpm with a large rotor, wherein the sample used was allowed to stand at room temperature (23±3° C.) for 30 minutes or more, taken in an amount of 27±3 g, and filled in a die cavity, and then, the Mooney viscosity was measured for 4 minutes by operating the platen.

Glass transition temperature (Tg, ° C.): The glass transition temperature was measured by a conventional method using differential scanning calorimetry (DSC).

confirmed that the hydroxyalkyl(meth)acrylate monomer-derived repeating unit was not uniformly distributed in the copolymer but concentrated on one side of the copolymer, whereas when the hydroxyalkyl(meth)acrylate monomer was added divisionally according to the present invention, the hydroxyalkyl(meth)acrylate monomer-derived repeating unit was uniformly distributed in the copolymer.

TABLE 1

| Classification | | Example | | | Comparative Example | | |
|---|---|---|---|---|---|---|---|
| | | 1 | 2 | 3 | 1 | 2 | 3 |
| Monomer (Parts by weight) | AMS[1] | 48 | 48 | 48 | — | 49 | 48 |
| | SM[2] | — | — | — | 48 | — | — |
| | BD[3] | 50 | 50 | 50 | 50 | 51 | 50 |
| | HPMA[4] | 2 | 2 | — | 2 | — | 2 |
| | HBMA[5] | — | — | 2 | — | — | — |
| Total amount | | 100 | 100 | 100 | 100 | 100 | 100 |
| Number of times HPMA was divisionally added | | 4 | 2 | 4 | 4 | — | 1 |
| Mw | | 627,400 | 624,000 | 608,900 | 701,200 | 633,000 | 657,400 |
| Mn | | 153,900 | 161,100 | 157,800 | 189,100 | 159,800 | 162,700 |
| MWD | | 4.07 | 3.87 | 3.86 | 8.70 | 3.96 | 4.04 |
| MV | | 52 | 53 | 50 | 53 | 50 | 52 |
| Tg | | −32 | −32 | −32 | −36 | −34 | −32 |

[1] AMS: α-methyl styrene
[2] SM: styrene
[3] BD: 1,3-butadiene
[4] HPMA: hydroxypropyl methacrylate
[5] HMBA: hydroxybutyl methacrylate Experimental Example 2

The amount of hydroxyalkyl(meth)acrylate monomer-derived repeating unit in the copolymer according to the polymerization conversion ratio at the time of preparing the conjugated diene-based copolymers of Example 1 and Comparative Example 3 were analyzed by NMR, respectively, and results thereof were shown in Table 2 below and the FIGURE.

TABLE 2

| | Polymerization conversion ratio (%) | | | |
|---|---|---|---|---|
| | 15 | 30 | 45 | 60 |
| Example 1 (% by weight) | 2.3 | 2.3 | 2.2 | 2.1 |
| Comparative Example 3 (% by weight) | 6.4 | 4.2 | 3.2 | 2.2 |

As shown in Table 2 above, it could be confirmed that as the polymerization proceeded continuously, the amount of the hydroxyalkyl(meth)acrylate monomer-derived repeating unit in the conjugated diene-based copolymer of Example 1 prepared according to the present invention was maintained constantly, whereas in the conjugated diene-based copolymer of Comparative Example 3, the amount of the hydroxyalkyl(meth)acrylate monomer-derived repeating unit was high at the early stage of polymerization, but gradually decreased as the polymerization proceeded. In other words, when the hydroxyalkyl(meth)acrylate monomer was added at once at the early stage of the polymerization, it could be Experimental Example 3

In order to comparatively analyze physical properties of the rubber composition including the conjugated diene-based copolymer prepared in Examples 1 to 3 and Comparative Examples 1 to 3 and the molded article produced therefrom, rubber specimens were produced as follows, and the Mooney viscosity, abrasion resistance and viscoelastic properties of the prepared rubber specimens were measured by the following methods, respectively. Results thereof are shown in Table 4 below.

Production of Rubber Specimens 100 parts by weight of the conjugated diene-based copolymers of Examples 1 to 3 and Comparative Examples 1 to 3 and 30 parts by weight of butadiene rubber (grade name BR1208, manufactured by LG Chemical Co., Ltd.) as raw rubber were blended under the blending conditions shown in Table 3 below. Table 3 shows each amount (part by weight) of the raw materials based on 100 parts by weight of the conjugated diene-based copolymer.

TABLE 3

| Classification | Raw material | Amount (part by weight) |
|---|---|---|
| First-stage kneading | Conjugated diene-based copolymer | 100 |
| | Butadiene rubber | 30 |
| | Silica | 70 |
| | Coupling agent | 12 |
| | Process oil | 9 |
| | Zinc white | 2 |
| | Stearic acid | 1 |
| | Antioxidant | 2 |
| | Anti-aging agent | 1.5 |
| | Wax | 2 |

TABLE 3-continued

| Classification | Raw material | Amount (part by weight) |
|---|---|---|
| Second-stage kneading | Sulfur | 1.5 |
| | Rubber accelerator | 2 |
| | Vulcanization accelerator | 2 |

Specifically, the rubber specimen was kneaded through first-stage kneading and second-stage kneading. In the first-stage kneading, the raw rubber (conjugated diene-based copolymer), a filler, an organic silane coupling agent, a process oil, a zinc white, a stearic acid, an antioxidant, an anti-aging agent, and wax were kneaded by using a Banbury mixer equipped with a temperature controller, thereby obtaining a primary blend. In the second-stage kneading, the primary blend was cooled to room temperature, then the primary blend, sulfur, rubber accelerator, and vulcanization accelerator were added to a kneader and mixed at a temperature of 100° C. or less to obtain a secondary blend, thereby producing a rubber specimen for measuring the following physical properties.

Mooney viscosity (MV, ($ML_{(1,4)}$, @100° C.)MU): The Mooney viscosity was measured by using MV-2000 (manufactured by ALPHA Technologies) at 100° C. at a rotor speed of 2±0.02 rpm with a large rotor, wherein the sample used was allowed to stand at room temperature (23±3° C.) for 30 minutes or more, taken in an amount of 27±3 g, and filled in a die cavity, and then, the Mooney viscosity was measured for 4 minutes by operating the platen.

Abrasion resistance: The abrasion resistance was measured by preliminary abrasion 500 times, followed by main abrasion 3,000 times, under 10 lb load at room temperature using No. 152 Akron Type Abrasion Test manufactured by Yasuda Co., Ltd., Japan, and measuring volume reduction.

Viscoelasticity: The tan δ was measured by performing a temperature sweep at a frequency of 10 Hz, a prestrain of 5% and a dynamic strain of 0.5% in a temperature range of −40° C. to 70° C. while raising a temperature at a rate of 2° C./min using DMTS 500N manufactured by Gabo GmbH & Co. KG., in Germany, and Compound Tg was shown from the value of the X axis of the inflection point in the tan δ graph. As the tan δ at 0° C., which is a lower temperature, was higher, wet road surface resistance was better, whereas as the tan δ at 60° C., which is a higher temperature, was lower, hysteresis loss was less, and low-running resistance (fuel economy) was better.

As shown in Table 4, it could be confirmed that when the conjugated diene-based copolymer was prepared according to the present invention, the abrasion resistance and the viscoelastic properties of the rubber composition including the prepared conjugated diene-based copolymer were remarkably improved. On the other hand, in Comparative Example 1 in which the styrene monomer was used instead of the α-Methylstyrene monomer and in Comparative Example 2 in which the hydroxyalkyl(meth)acrylate monomer was not added in the polymerization of the conjugated diene-based copolymer, it could be confirmed that the abrasion resistance was deteriorated, the glass transition temperature of the rubber composition was relatively low, and both the wet road surface resistance and the low-running resistance were deteriorated. In particular, even though both the α-methylstyrene monomer and the hydroxyalkyl(meth)acrylate monomer were added, in Comparative Example 3 in which the hydroxyalkyl(meth)acrylate monomer was added together at one time to the early stage of the polymerization (polymerization conversion ratio: 0%) unlike the present invention, it could be confirmed that the viscoelastic properties such as wet road surface resistance and low-running resistance, and the like, were deteriorated, which is because the hydroxyalkyl(meth)acrylate monomer-derived repeating unit was not uniformly distributed in the conjugated diene-based copolymer.

From the above results, the present inventors found that when the conjugated diene-based copolymer was prepared and the prepared conjugated diene-based copolymer was used as the raw rubber to prepare the rubber composition, the abrasion resistance and the viscoelastic properties of the rubber composition including the conjugated diene-based copolymer were excellent by securing abrasion resistance of the rubber composition, increasing the glass transition temperature of the conjugated diene-based copolymer, and imparting silica affinity.

The invention claimed is:
1. A method for preparing a conjugated diene-based copolymer comprising:
(S10) performing emulsion polymerization on an α-methylstyrene monomer, a conjugated diene-based monomer, and a hydroxyalkyl(meth)acrylate monomer,
wherein the α-methylstyrene monomer and the conjugated diene-based monomer are added together at one time when a polymerization conversion ratio of the emulsion polymerization is 0%, and the hydroxyalkyl(meth)acrylate monomer is divisionally added two or more times when the polymerization conversion ratio of the emulsion polymerization is 0% to 80%, and

TABLE 4

| | | Example | | | Comparative Example | | |
|---|---|---|---|---|---|---|---|
| Classification | | 1 | 2 | 3 | 1 | 2 | 3 |
| | Mooney viscosity (MU) | 61 | 63 | 61 | 52 | 60 | 63 |
| Abrasion resistance | Specific gravity | 1.184 | 1.172 | 1.180 | 1.171 | 1.178 | 1.182 |
| | Loss content (cc) | 0.079 | 0.085 | 0.084 | 0.089 | 0.094 | 0.084 |
| Viscoelasticity | Compound Tg (° C.) | −10 | −10 | −10 | −12 | −13 | −10 |
| | Tan δ 0° C. | 0.628 | 0.602 | 0.599 | 0.467 | 0.359 | 0.583 |
| | Tan δ 60° C. | 0.074 | 0.079 | 0.080 | 0.087 | 0.110 | 0.081 | the α-methylstyrene monomer is added in an amount of 10% by weight to 50% by weight, the conjugated diene-based monomer is added in an amount of 49% by weight to 89% by weight, and the hydroxyalkyl(meth) acrylate monomer is added in an amount of 0.1% by weight to 5% by weight, based on the total monomer amount, wherein an amount of the hydroxyalkyl(meth)acrylate monomer-derived repeating unit is maintained within a range of 0.1% by weight to 5% by weight based on the total amount of the respective conjugated diene-based copolymers according to the polymerization conversion ratio of the emulsion polymerization, and wherein the hydroxyalkyl(meth)acrylate monomer comprises hydroxypropyl(meth)acrylate or hydroxybutyl (meth)acrylate.

2. The method of claim 1, wherein the hydroxyalkyl (meth)acrylate monomer is divisionally added two to four times when the polymerization conversion ratio of the emulsion polymerization is 0% to 60%.

3. The method of claim 2, wherein the hydroxyalkyl (meth)acrylate monomer is added in same amount at each divisional addition.

4. The method of claim 1, wherein an amount of the hydroxyalkyl(meth)acrylate monomer-derived repeating unit is maintained within a range of deviation ±2% by weight based on the total amount of the respective conjugated diene-based copolymers according to the polymerization conversion ratio of the emulsion polymerization.

5. The method of claim 1, wherein the conjugated diene-based monomer comprises at least one selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene.

6. The method of claim 1, wherein the emulsion polymerization is performed in the presence of an emulsifier, an initiator, or a molecular weight regulator.

7. The method of claim 6, wherein the emulsifier comprises at least one selected from the group consisting of phosphate-based, carboxylate-based, sulfate-based, succinate-based, sulfosuccinate-based, sulfonate-based, and disulfonate-based emulsifiers.

8. The method of claim 6, wherein the emulsifier is added in an amount of 0.1 parts by weight to 5 parts by weight based on 100 parts by weight of the total monomer amount.

9. The method of claim 6, wherein the molecular weight regulator comprises at least one selected from the group consisting of mercaptans; halogenated hydrocarbons; and sulfur-containing compounds.

10. The method of claim 6, wherein the molecular weight regulator is added in an amount of 0.2 parts by weight to 0.6 parts by weight based on 100 parts by weight of the total monomer amount.

11. The method of claim 6, the initiator is added in an amount of 0.01 parts by weight to 2 parts by weight based on 100 parts by weight of the total monomer amount.

12. The method of claim 1, wherein the emulsion polymerization is performed at 5° C. to 10° C.

\* \* \* \* \*